Patented May 11, 1926.

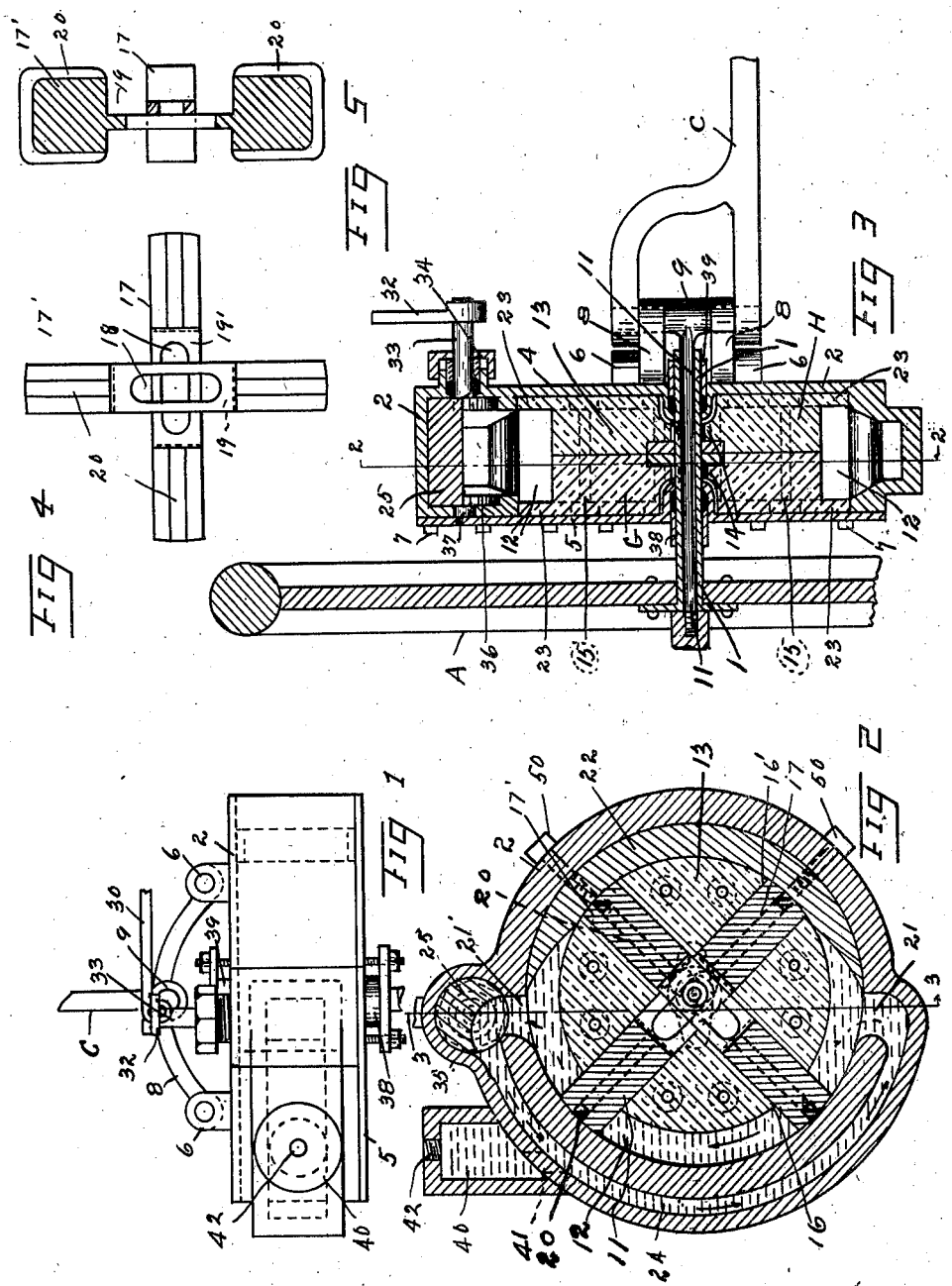

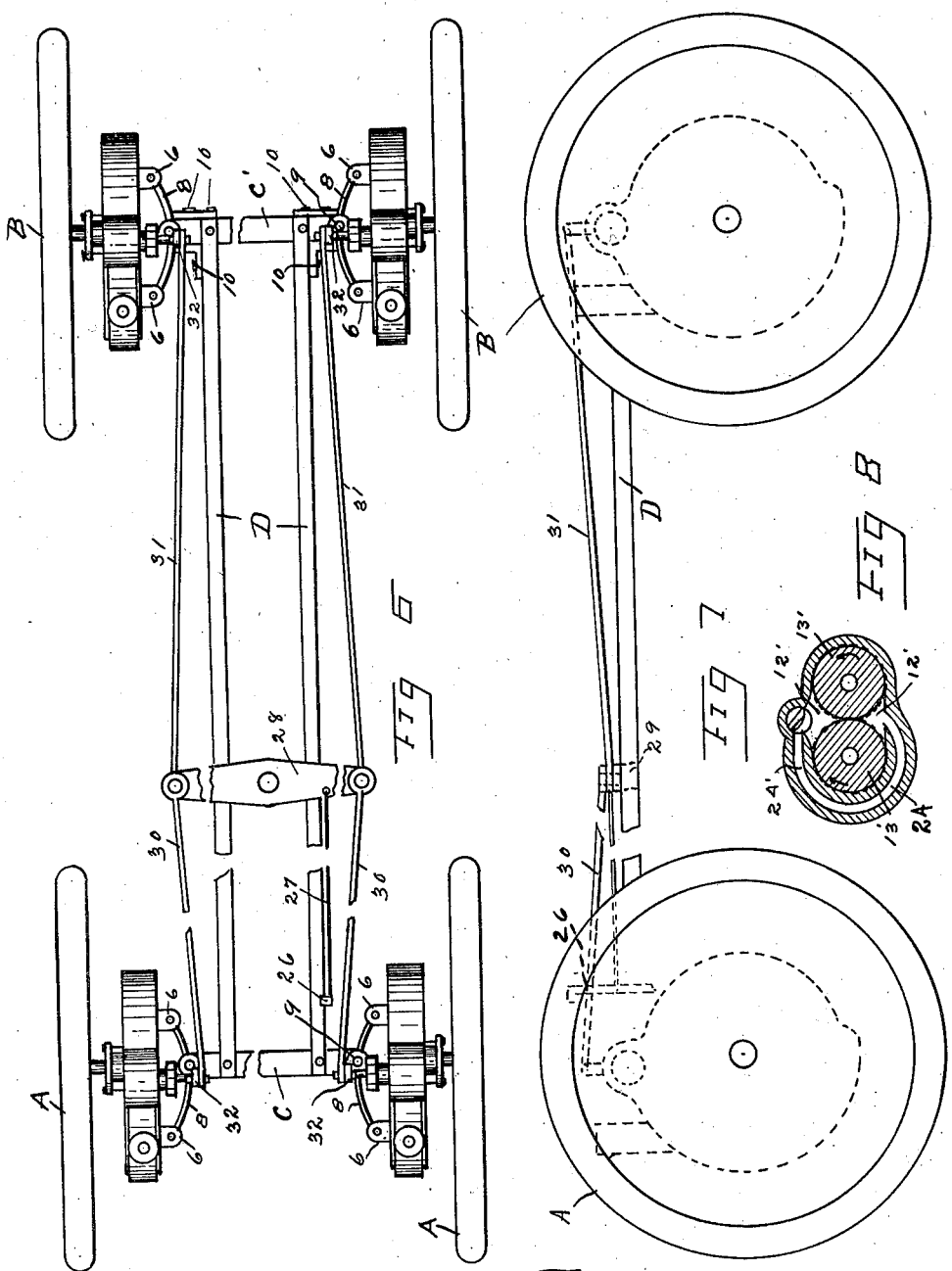

1,584,223

UNITED STATES PATENT OFFICE.

FRANCIS L. HORSPOOL AND JOHN C. MILES, OF SALT LAKE CITY, UTAH.

ROTARY LIQUID BRAKE.

Application filed June 2, 1925. Serial No. 34,306.

This invention relates to a new and useful brake for vehicles in the form of a rotary hydraulic or liquid brake by means of which a vehicle wheel is used as a driving element to operate a driven element incased within a body of fluid to check the speed of the vehicle, or in other words to check the speed of the driving element.

The invention being a rotary liquid brake is more particularly adapted for use in stopping the speed of a vehicle wheel to which it is attached by utilizing the power of the wheel for the compressing of the liquid within the chamber in which the driving element revolves, the principle of which is to use the vehicle wheel to drive a pump which rotates within a casing to pump liquid through a conduit in said casing in such a manner that when the flow of liquid is checked in passing through said conduit the pump will compress the liquid which causes the wheel to be stopped.

One object of this invention is to dispense with the friction brake device heretofore employed in stopping the speed of a vehicle and substitute therefor a comparatively new system of braking means which is simple, compact and inexpensive apparatus which is controlled essentially by the regulation of the circulation of braking fluid which establishes a braking or locking connection between a driven element and a stationary element.

Another object of this invention is to relieve the braking fluid of all duty when it is desired to move the vehicle, this is accomplished by the opening of a valve to allow the liquid to be freely circulated through a conduit that is in the casing from one side of the oil chamber to the other.

In the accompanying drawings forming a part of this specification and in which corresponding parts are denoted by like reference characters, is illustrated the principle in preferred form of the embodiment of the invention capable of carrying the same into practical operation. It being understood that the invention is not necessarily limited thereto, as various changes in the shape, proportions and general assemblage of the parts to be resorted to without departing from the principles of the invention or sacrificing any of the advantages, and the right is therefore reserved to make all the changes and modifications which will fairly fall within the scope of the invention and claims therefor.

With these and other objects in view the invention consists of the following arrangement and construction of parts.

Referring to the drawings in which;

Figure 1 is a plan view of the invention showing it applied to a front wheel of an automobile.

Fig. 2, is a vertical sectional view on line 2—2 Fig. 3.

Fig. 3, is a vertical sectional elevation on line 3—3 Fig. 2 showing the casing, liquid chamber and driven or braking element and the automobile wheel which is the driving element.

Fig. 4, is a detail view of the pistons in assembled position as arranged in the piston head which forms the driven element.

Fig. 5, is a vertical section view of Fig. 4.

Fig. 6, is a plan view of an automobile frame showing the invention applied to all four wheels thereof.

Fig. 7, is a side view of Fig. 6.

Fig. 8, is a vertical section view of a gear pump which we may use in some cases, this pump may be of any of the standard designs now used.

The reference character A denotes the front wheels, B the back wheels, C the front axle, C' the back axle, D the braces connecting the front and back axle.

The invention comprises a vehicle wheel A having a sleeve 1 projecting therefrom and secured thereto by bolts or rivets. A casing 2 having a front wall 5 and a back wall 4. The back wall being integral therewith and having a plurality of lugs 6 integral therewith. The front wall 5 is secured to the casing by bolts 7.

Pivotally secured to the lugs 6 are arms 8 which project from the hinge bearing 9 and are integral therewith. The hinge bearing 9 is pivotally secured to the front axle. When the brake is applied to the back axle it is secured thereto by bolts 10.

Projecting from the hinge 9 is a shaft 11 which forms the journal for the sleeve 1. When the brake is placed on the back axle the journal will be the ends of the axle upon which the wheel turns.

Within the casing and between the walls thereof is formed a chamber 12 in which is placed a rotating piston head 13 which revolves in a body of liquid and is driven by the wheel A.

The piston head is constructed in two sections G and H, each section being secured to the sleeve 1 by a key 14 and are secured together by bolts 15.

In the piston head is placed two diametrical slots 16 and 16' cut therethrough at right angles to each other, into these slots is placed sliding pistons 17 and 17' which are shown in detail in Fig. 4, having first removed one of the sections of the head 13 and placing the sleeve through the slot 18 in each of the pistons. After the pistons have been so placed in the section of the piston head the removed section of the head is now replaced and again attached to the remaining section.

The piston 17' has a central notch 19 cut in its under side and the piston 17 has a similar notch 19' cut in its upper side. These notches being in depth substantially half the width of the piston so that the pistons may be interlocked and inserted in the slots in the piston head.

Each of the pistons are provided with packing strips 20 which engage the walls of the chamber. The length of the pistons are the shorter diameter of the elliptical chamber 12 and are such that they are in running contact with the walls of the chamber.

Secured to the side of the liquid chamber is an abutment 22 which is secured therein by screws. When the abutment is so placed it forms an elliptical chamber of part of the depth of the chamber. It being narrower than the depth of the chamber and placed at equal distance from each side of the chamber a groove is formed between it and the walls of the chamber. Through this groove the flanges 23 of the piston head travel, thus making the space between the walls and the abutment nearly oil tight, but not so tight as to cause a sudden stopping of the wheel when the valve is completely closed or moved into the emergency position.

The abutment is placed within the liquid chamber and secured therein after the inner section of the piston head has been placed into the oil chamber, and then it is secured therein from the outside of the casing by the screws 50 passing through the casing and into the abutment.

In one side of the casing is placed a conduit 24 having an intake 21' and an outlet 21. The intake and outlet are reversed when the piston head is moved backward or in the direction of the arrows.

A valve 25 is placed in the opening above the intake 21. This valve may be placed at any other desired place in the conduit 25 that may be desired. The valve when open allows the liquid to be pumped or pass through the conduit in the operating of the piston.

A foot lever 26 is secured to the floor of the automobile in the usual manner. To the foot lever is secured one end of a rod 27 the other end thereof being secured to a brake lever 28 which is pivotally secured to a cross brace 29 on the frame D. At each end of the brake lever is pivotally secured the front brake rods 30 and the back brake rods 31 while the other end of each rod is pivotally connected to a lever 32 which is secured to the valve stem 33.

The valve stem 33 passes through a suitable packing gland 34 integral with the back wall. The valve chamber 35 at the front end is closed by a bearing block 36 which is secured therein by the front wall and is provided with a central opening in which is journaled the inner end 37 of the valve 35.

On the front head is a suitable gland bearing 38 and on the back head is another gland bearing 39. These bearings receive the sleeve 1 of the wheel A and form a close running fit for the sleeve.

Located on the outside of the casing is a hollow projection or oil cup 40 in which is placed the oil in filling the chamber and conduit. The liquid or oil when placed into the projection passes through the opening 41 into the conduit and then into the chamber 12. After the casing has been filled with oil a plug is screwed into the hole 42 to close the opening which makes the chambers air tight.

In Figure 8 is shown the same principle of braking power by using a pair of pumping gears 13' which forces the liquid through the conduit 24' and applies the braking power in the same manner when the valve is closed. On some cars this pump principle will have to be used. As the movement of the liquid is the same in both cases only the operation of the brake shown in Fig. 2, will be described.

In the operation of the invention, assuming that the piston head 13 is operated in the opposite direction shown by the arrows the car would be moving forward. The piston head would then be revolving at the same speed as the wheel to which it is attached by the sleeve 1. If the valve is wide open the liquid will be forced through the bottom of the casing into the conduit and through the conduit and out of the upper opening 21' back into the chamber 12. When the valve is part open the oil will be compressed to a certain degree thus slowing the speed of the car. When the valve is entirely closed the body of oil will be trapped and compressed between the valve 25 on one side and whichever piston happens at the moment to be making a tight running fit with the casing chamber wall on the other side will form an oil pack or brake which establishes for a time the braking or locking connection between the piston head and the casing, such time being determined by the rate of leakage between the running parts which is a constant factor and the leakage between the piston and the walls of the chamber will not effect the function of the braking power of the brake as the piston following will pick up all leakage and form an oil pack in its turn.

To operate the brake is as follows, place the foot on the lever 25 which operates brake lever 28 which in turn operates rods 30 and 31 to close the valve 25. The valves on the right are drawn back and the valves on the left are moved forward to close as to the movement of the brake lever 28.

Having thus described the invention what we claim as new and desire to secure by Letters Patent, is;

1. A rotary liquid brake the combination with a vehicle wheel having a sleeve projecting therefrom, a casing, said sleeve passing through said casing, a rotating piston head secured to said sleeve within said casing, pistons operating within said head, liquid within said casing, said piston head being driven by said vehicle wheel, said pistons to force the liquid through a conduit in said casing, a valve in said casing to be closed to prevent said pistons forcing said liquid through said conduit to form an oil pack to set the brake, means for securing said brake to the vehicle and means for operating said brake.

2. A rotary liquid brake for vehicles having a casing in combination with a vehicle wheel having a sleeve projecting therefrom, a journal passing through said sleeve, means for securing said wheel on said journal, a rotating piston head secured to said sleeve within said casing, pistons operated by the rotation of said piston head, said casing having a conduit therein, said pistons forcing the liquid through said conduit, a valve in said conduit for checking the flow of liquid through said conduit in the setting of the brake by the locking of said pistons with the oil pack formed between said valve and said pistons, means for securing said casing to a vehicle and means for operating said brake.

3. A rotary liquid brake for vehicles in combination with a driving member and a driven member, a casing for said driven member, a sleeve projecting from said driving member upon which said driven member is detachably mounted within said casing, said casing having a conduit therein, a chamber within said casing in which operates said driven member, said casing having means thereon in which is placed liquid in filling said chamber, means on said driven member for forcing said liquid through said conduit, a valve in said casing and passing through said conduit, said valve to check the flow of liquid through said conduit in the setting of the brake, means for operating said valve, means on said casing for supporting said sleeve in an oil tight packing and means for securing said casing to the vehicle.

4. A rotary liquid brake in combination with a vehicle wheel, said wheel having a sleeve projecting therefrom, a rotating piston head secured to said sleeve, a casing having a chamber therein in which said piston head revolves in a body of liquid, pistons on said head, a conduit in said casing through which said oil is forced by said pistons in the operation of said piston head, a valve operating in a valve chamber passing through said conduit, said valve for regulating the flow of liquid through said conduit, means for operating said valve, means for filling said casing with liquid, glands secured to the casing, a valve stem passing through one of said glands and said sleeve passing through the other of said glands, said glands when packing is therein prevents the liquid escaping from said casing, means for securing said casing to said vehicle.

5. A rotary liquid brake comprising a vehicle wheel for setting said brake, said wheel having a sleeve projecting therefrom, an axle for supporting said wheel having a journal thereon, said journal passing through said sleeve, means on said journal for securing said wheel thereon, a casing, a rotating piston head secured to said sleeve within said casing, said casing having a chamber therein in which is placed a liquid which is operated upon by sliding pistons operated by said piston head, said casing having a conduit therein and ports leading thereto from said chamber, a valve operating in said conduit, said conduit for the free circulation of the liquid in said casing when said valve is fully open, said valve for controlling the flow of liquid through said conduit for the regulating of the speed of the vehicle, means for securing said casing to said axle, said valve having a valve stem projecting therefrom and passing through an oil tight gland the outer end thereof having a lever secured thereon to which is attached an operating lever, means for operating said lever, said sleeve passes through a pair of glands which answer as bearings for said sleeve and when packing is placed therein become oil tight, said valve and said piston for forming a liquid pack within said casing chamber when said valve is closed for the stopping of the vehicle and means for securing said casing to the axle of a vehicle.

6. A vehicle brake the principle of which is to use a vehicle wheel to drive a pump to force liquid which is inclosed within a casing through a conduit from one side of said casing to the other and constructed in such a manner that when the flow of liquid is checked in said conduit the pump will compress the liquid within said casing by the force of the wheel and thus stopping the wheel.

In witness whereof we affix our signatures.

FRANCIS L. HORSPOOL.
JOHN C. MILES.